May 25, 1965  J. M. BRINKERHOFF  3,185,926
SYSTEM FOR RECOGNITION OF PARTICULAR DISTRIBUTIONS OF PULSES
REPRESENTING AN INPUT WAVEFORM
Filed July 26, 1962  2 Sheets-Sheet 1

INVENTOR.
JORIS M. BRINKERHOFF
BY
Weingarten, Overbuck & Pandiscio
ATTORNEYS

United States Patent Office 3,185,926
Patented May 25, 1965

3,185,926
SYSTEM FOR RECOGNITION OF PARTICULAR DISTRIBUTIONS OF PULSES REPRESENTING AN INPUT WAVEFORM
Joris M. Brinkerhoff, Arlington, Mass., assignor to Laboratory for Electronics, Inc., Boston, Mass., a corporation of Delaware
Filed July 26, 1962, Ser. No. 212,685
10 Claims. (Cl. 324—77)

The present invention relates in general to recognition systems and in particular to a new and novel recognition system wherein the magnitude of the output is indicative of the likelihood that a sequence of random pulses represents a given waveform of true average counting rate.

There are several areas of technology in which recognition of the waveform, giving rise to a sequence of random pulses, is important. Such a waveform might be produced, for example, when an object passes in front of a radioactive source. The radiation emanating from the source is thus intercepted by the object. Since, however, the radiation is emitted from the radioactive source with inherent random variations, the pattern of transmitted radiation quanta, representative of the passage of the object, is statistically distributed. In many instances, it is desirable to know what object has passed; for this reason, the radiation transmitted is measured by a radiation detector whose output series of pulses is transcribed, in the present state of the art, by a counting-rate meter into a recorded waveform. This waveform represents an estimate of the distribution in time of the average counting rate as determined by the integration circuitry of the counting-rate meter, which distribution is thus representative of the probability per unit time of registering a pulse. What is displayed, therefore, is an approximation to the waveform of counting probability. This recorded waveform is then visually compared with several known waveforms, and an experienced judgment is made as to which waveform (if any at all) is most closely represented by the rate meter output. Because, however, of the random source fluctuations, the experienced judgment may be completely unreliable; the observer, in addition, has no way of quantitatively deciding how closely the recorded waveform resembles one of the several known waveforms, nor is it possible to put any confidence limits on his estimate.

Although the counting-rate meter gives the average number of counts per unit time interval, for a rapidly fluctuating count rate it does not give the true average; this is due essentially to the finite time constant of the integration circuit. As a result, the counting-rate meter cannot instantaneously follow large fluctuations in the number of incident pulses and hence cannot give the true average rate; such large fluctuations may also completely dominate the output of the circuit for several time-constants thereafter. This factor adds to the distortion of the recorded waveform and hence makes any visual comparison all the more difficult.

It is, therefore, a primary object of the present invention to provide a novel recognition system.

It is another object of the present invention to provide a recognition system which yields the relative likelihood that a sequence of random pulses represents a particular waveform and which does not depend on visual comparison.

It is a further object of the invention to provide a recognition circuit wherein each discrete input pulse is selectively weighted over the integration period of the circuit according to a preselected waveform.

It is still another object of the present invention to provide novel recognition circuitry whereby a discrete sequence of pulses are selectively weighted and summed to yield a continuous output representataive of the instantaneous likelihood that such sequence of pulses represents a particular waveform.

It is still a further object of the invention to provide a recognition system whereby a sequence of random pulses generates a sequence of identical waveforms whose shape is a function of a known waveform and the magnitude of the summation thereof is indicative of the likelihood that such a sequence of pulses represents the known waveform.

It is still another object of this invention to provide a pulse integrator of arbitrary waveform suitable for use in a waveform recognition circuit.

In one embodiment of the present invention, the recognition system receives a sequence of pulses of equal height statistically representing an unknown waveform; the system thereupon generates a series of continuous voltages for each of these pulses. The magnitude and polarity of each of these voltages is determined by a preselected function of a known waveform to which the unknown waveform is being compared. The system then continuously sums all of the voltages generated by the pulses and yields an integrated output thereof. The magnitude of this output is indicative of the likelihood that the sequence of pulses represents the known waveform.

These and other objects of the present invention, together with further features and advantages thereof, will become more apparent from the following detailed description, in which.

Figure 1:
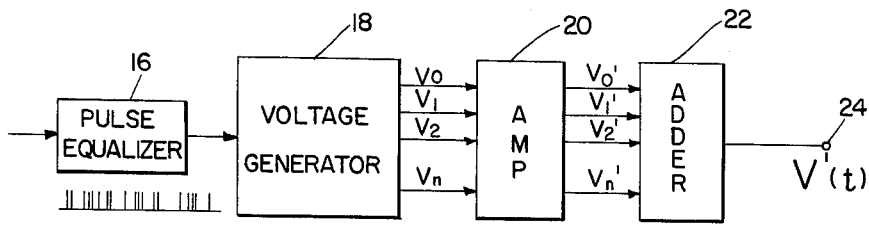
FIGURE 1 is a block diagram of an embodiment of the invention.
Figure 1A:
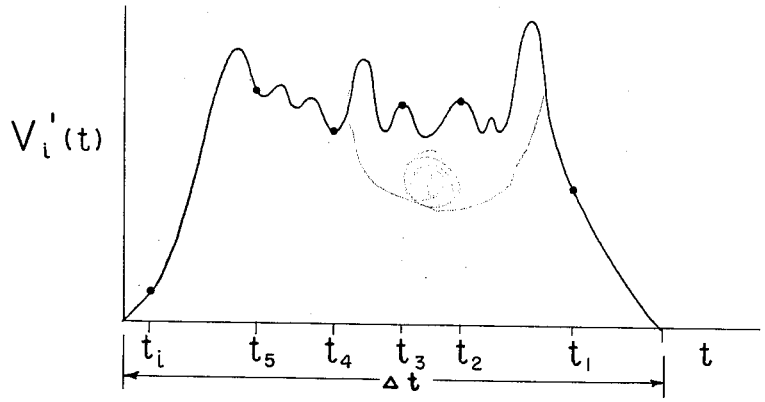
FIGURE 1a illustrates graphically a typical voltage output of the appartaus of FIGURE 1.
Figure 2:
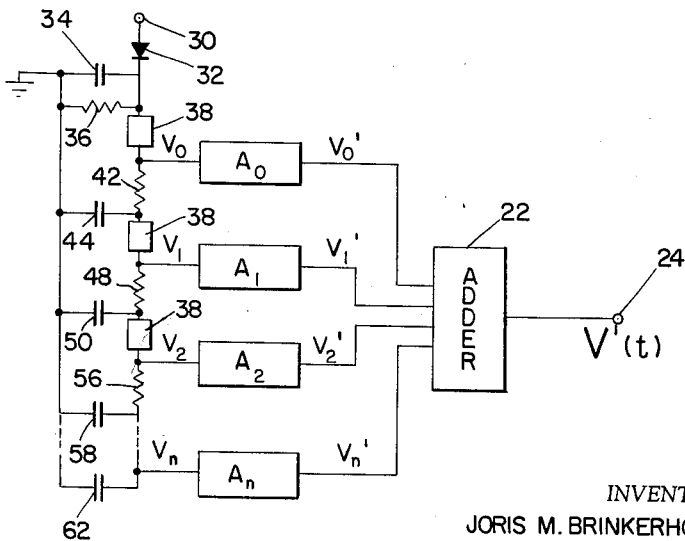
FIGURE 2 illustrates in more detail the circuitry in FIGURE 1.

In specific reference to FIGURE 1, a series of pulses statistically representative of an unknown waveform are received by a voltage generator 18; these pulses, as previously mentioned, may represent an unknown object passing in front of a radioactive source and are generated by a radiation detector (not shown), such as a Geiger counter. In addition, these pulses are made of equal height by a pulse equalizer 16. For each such pulse, the voltage generator 18 generates a series of continuous voltages $v_n(t)$; each of such voltages $v_n(t)$ is individually amplified or attenuated (positively or negatively) in a preselected manner by voltage amplifier 20 to yield the voltages $v_n'(t)$. The voltage amplifier 20 may consist of a series of separate amplifiers, as shown in FIGURE 2, or a single amplifier adapted to individually attenuate each of such voltages $v_n(t)$. The voltages $v_n'(t)$, for a single pulse, are summed by the addition circuit 22 to yield a continuously weighted output voltage $V_i'(t)$; an example of such an output voltage $V_i'(t)$ over a time interval $\Delta t$ is graphically shown in FIGURE 1a. Since the primary object of the invention is to indicate the likelihood that a sequence of random pulses represents a known waveform, the shape of the voltage curve $V_i'(t)$ (and hence the adjustment of the amplifier 20) is determined in accordance with a function of the known waveform as will be shown hereafter.

By proper adjustment of the amplifier 20, each individual voltage $v_n(t)$ can be so amplified that the total summation gives any desired waveform; hence, an individual pulse is selectively and continuously weighted over the interval $\Delta t$. A series of pulses then entering the recognition system generates a sequence of identical waveforms separated in time by the spacing of the pulses; at any instant in time, therefore, each pulse is being weighted by the identical waveform but appears on a different portion thereof and hence at that instant has a different weight generally from the pulses preceding and following it. A combined picture of such a series of pulses is shown in FIGURE 1a where the times $t_1 \ldots t_i$ represent different times during the integration period $\Delta t$, and the spacing of such times $t_1 \ldots t_i$ is determined by the pulse spacing. The total output $V'(t)$, appearing at terminal 24 in FIGURE 1, is a continuous summation of the voltages $V_i'(t)$ generated by the pulses appearing at $t_1 \ldots t_i$. When the voltage $V_i'(t)$ is determined by an appropriately selected function of a known waveform, the output voltage $V'(t)$ is maximized if the spacing of the pulses is in fact a statistical representation of the known waveform.

In FIGURE 2, a pulse integrator of arbitrary waveform for use in this recognition system is illustrated. The input pulses are applied at terminal 30 through diode 32 to a series of R-C networks with resistors 36, 42, 48, 56 . . . and capacitors 34, 44, 50, 58 . . . 62, each of such R-C networks being separated by isolators 38, such as cathode follower circuits. The output voltages $v_n(t)$ are taken off at each stage and directed into voltage amplifiers $A_n$ which yield the voltages $v_n'(t)$. The voltages $v_n'(t)$ are then summed by addition circuit 22 to yield an integrated output $V'(t)$ at terminal 24. If all the resistors have an identical value R and all the condensers a value C, it can easily be shown that each of the output voltages $v_n(t)$ has the form:

$$v_n(t) = \text{constant} \frac{(t/rc)^n e^{-t/rc}}{n'} \quad (1)$$

Figure 2A:
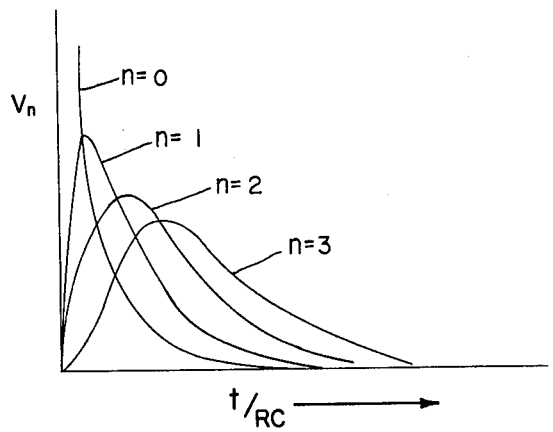
FIGURE 2a illustrates graphically typical voltage outputs of the voltage generator in FIGURE 2.

Such functions are commonly known as Poisson functions. A graphical representation of typical voltages which can be produced by apparatus such as illustrated in FIGURE 2 is shown in FIGURE 2a.

Any known waveform may be approximated to any preassigned degree of accuracy by taking an appropriate linear combination of some sufficiently large number of voltages $v_n(t)$ with RC sufficiently small. The coefficients of such a series can be derived by well-known techniques in a manner analogous to the derivation of the coefficients in a generalized Fourier series. If the resistors and condensers are not equal and if the isolators are not present, the voltages $v_n(t)$ are not given by Equation 1 but can still be calculated and appropriately weighed and summed. It should be noted that the combination of elements in FIGURE 2 is merely exemplary of one such circuit capable of generating an independent series of voltages $v_n(t)$ for each pulse and the scope of the invention is not deemed to be limited thereto.

It has been stated previously that the voltages $v_n(t)$ are selectively amplified to give an indication of the likelihood that a sequence of random pulses represents a known waveform. Such a method of selection is presented in "Statistical Considerations Applicable to Communications Systems Utilizing Discrete Quanta" by J. M. Brinkerhoff, RADC-TN-61-115. It is shown therein that the relative likelihood that a sequence of random pulses would result from a waveform $F(t)$ is given by:

$$\ln(L) = \sum_i \ln F(t_i) \quad (2)$$

where L is the relative likelihood and the summation is taken over all pulses. Since the waveform in FIGURE 1a can be arbitrarily adjusted, $V_i'(t)$ can be made identically equal to $\ln F(t)$, and the output voltage $V'(t)$ at terminal 24 yields the desired result.

Figure 3:
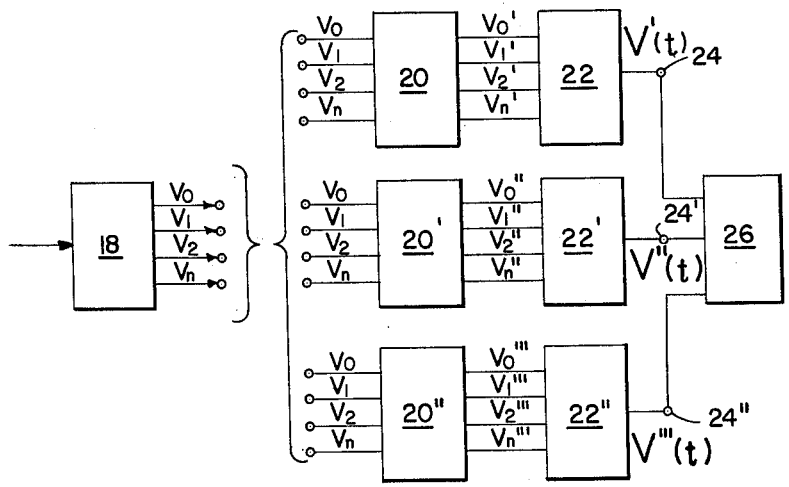
FIGURE 3 is a block diagram of another embodiment of the invention.

In FIGURE 3, apparatus is illustrated which is capable of giving the relative likelihood that a sequence of random pulses would have resulted from one of several known waveforms. The voltages $v_n(t)$ from the voltage generator 18 are shunted into amplifiers 20, 20', and 20" which are adjusted in accordance with known waveforms, for example, $F(t)$, $G(t)$, and $H(t)$. The voltages $v_n'(t)$, $v_n''(t)$, and $v_n'''(t)$ are summed by summation circuits 22, 22', and 22", and the integrated voltages $V'(t)$, $V''(t)$, and $V'''(t)$ are then connected to comparison circuit or voltage discriminator 26 through output terminals 24, 24', and 24". The comparison circuit 26 by comparing the magnitudes of the voltages $V'(t)$, $V''(t)$, and $V'''(t)$ indicates which waveform, i.e., $F(t)$, $G(t)$, or $H(t)$, has the greatest likelihood of being represented by the sequence of random pulses.

Although the invention has been described in terms of a voltage generator generating a series of voltages which are selectively weighted and summed, nonetheless, the invention should not be construed to be limited to such a generation of a waveform. The invention includes any circuit that generates a discrete series of identical waveforms which are preselected functions of a known waveform on the application of a series of pulses; in other words, for each pulse, the circuit need merely generate a waveform that is preselected function of a known waveform; these waveforms are then summed as previously described to yield the integrated output $V'(t)$.

While the primary purpose of the invention is to determine the likelihood that a sequence of pulses of equal height represents a preselected waveform, the invention is capable of functioning with equally spaced pulses of variable heights and also continuous electrical waveforms. While the output in the latter two cases does not give the likelihood in any strict mathematical sense, still if the area under each of the known waveforms is equal, the output will be indicative of the presence at the input of the preselected known waveform.

Having described the invention, it is apparent that numerous modifications and improvements may now be made by those skilled in the art, all of which fall within the scope of the invention; therefore, the invention herein disclosed should be construed to be limited only by the spirit and scope of the appended claims.

What is claimed is:

1. Recognition system for identifying a series of pulses of substantially constant duration and amplitude as having a distribution in time characteristic of a known waveform comprising:
   (a) means for generating in response to each of said pulses a specific voltage time waveform, said specific waveform being selected as a predetermined mathematical function of said known waveform; and
   (b) means for continuously summing all of said specific waveforms to give an integrated output thereof, the magnitude of said output being indicative of the likelihood that said series of pulses represents said known waveform.

2. The apparatus of claim 1 wherein said predetermined mathematical function is the logarithm of the known waveform.

3. Recognition system for identifying a sequence of randomly occuring pulses of constant duration and amplitude as having a statistical distribution in time characteristic of a known waveform comprising:
   (a) means responsive to said sequence of pulses for generating in response to each of said pulses a specific waveform therefrom, said specific waveform being a mathematical function of said known waveform; and
   (b) means for continuously summing all of said specific waveforms to give an integrated output thereof, the magnitude of said output being indicative of the likelihood that said sequence of pulses represents said known waveform.

4. Recognition system for identifying a series of pulses of substantially constant duration and amplitude as having a distribution in time characteristic of a known waveform comprising:
   (a) means for equalizing the amplitude of said pulses;
   (b) means for generating in response to each of said pulses a specific identical waveform, said specific waveform being selected as a mathematical function of said known waveform; and (c) means for continuously summing all of said specific waveforms to give an integrated output thereof, the magnitude of said output being indicative of the likelihood that said series of pulses represents said known waveform.

5. Recognition system for characterizing a sequence of pulses of substantially constant amplitude and duration as having a distribution in time representative of an unknown waveform comprising:

(a) means for generating in response to each of said pulses in said sequence one or more series of specific waveforms, each of said series of specific waveforms being a mathematical function of a respective known waveform;

(b) means for continuously summing all of said specific waveforms in each of said series to give an integrated output for each of said series, the magnitude of each of said outputs being indicative of the likelihood that said sequence of pulses represents the respective known waveform; and (c) discriminating means for comparing the magnitude of said outputs.

6. Recognition system for identifying a series of pulses of substantially constant amplitude and duration as having a distribution in time characteristic of a known waveform comprsing:

(a) means for generating in response to each of said pulses a time sequence of voltages, the magnitude of each of said voltages in said time sequence being selected as a mathematical function of said known waveform; and (b) means for continuously summing all of said generated voltages to give an integrated output thereof, the magnitude of said output being indicative of the likelihood that said series of pulses represents said known waveform.

7. Recognition system for identifying a series of pulses of substantially constant amplitude and duration as having a distribution in time characteristic of a known waveform comprising:

(a) a plurality of RC circuits connected in series having an input thereto and a series of outputs therefrom, means connecting said series of pulses to said input, said plurality of connected RC circuits generating for each of said pulses a time sequence of output voltages;

(b) means for adjusting the magnitude of each of said output voltages in said time sequence in accordance with a preselected mathematical function of said known waveform; and (c) means for continuously summing all of said adjusted output voltages to give an integrated output thereof, the magnitude of said output being indicative of the likelihood that said series of pulses represents said known waveform.

8. The apparatus of claim 7 wherein said adjusting means comprises an amplifier for individually adjusting the magnitude of each of said output voltages in said generated sequence of output voltages.

9. The apparatus of claim 7 wherein said adjusting means comprises a series of amplifiers, each of said amplifiers being coupled to one of said output voltages in said generated sequence of output voltages.

10. A pulse integrator of arbitrary waveform for use in a recognition system comprising:

(a) a plurality of RC circuits connected in series and having an input thereto and a series of individual outputs therefrom, said plurality of connected RC circuits generating in response to each received pulse a sequence of output voltages;

(b) means for adjusting the magnitude of each of said output voltages in said sequence in accordance with a preselected mathematical function of a chosen waveform; and (c) means for summing each of said output voltages in said sequence to give an integrated output voltage representative of said preselected function of said chosen waveform.

References Cited by the Examiner

UNITED STATES PATENTS

| 2,646,465 | 7/53 | Davis | 179—1 |
|---|---|---|---|
| 2,794,965 | 6/57 | Yost | 235—181 |
| 2,921,738 | 1/60 | Greening | 235—181 |
| 2,963,647 | 12/60 | Dean | 324—77 X |
| 3,036,268 | 5/62 | Smith | 324—77 |

OTHER REFERENCES

"Correlation Functions and Communication Applications," article in Electronics, June 1950, pages 86–92.

WALTER L. CARLSON, *Primary Examiner.*